US012680659B1

(12) United States Patent
Gallian

(10) Patent No.: US 12,680,659 B1
(45) Date of Patent: Jul. 14, 2026

(54) DYNAMIC PILING-EMPLACEABLE LIGHTING FOR DOCKS AND PIERS

(71) Applicant: TIEONEON LLC, Newport Beach, CA (US)

(72) Inventor: George D. Gallian, Newport Beach, CA (US)

(73) Assignee: TIEONEON LLC, Newport Beach, CA (US)

( * ) Notice: Subject to any disclaimer, the term of this patent is extended or adjusted under 35 U.S.C. 154(b) by 0 days.

(21) Appl. No.: 18/896,687

(22) Filed: Sep. 25, 2024

Related U.S. Application Data

(60) Provisional application No. 63/540,739, filed on Sep. 27, 2023.

(51) Int. Cl.

| | |
|---|---|
| ***F21S 8/00*** | (2006.01) |
| ***F21S 8/08*** | (2006.01) |
| ***F21S 9/03*** | (2006.01) |
| ***F21V 17/00*** | (2006.01) |
| ***F21V 21/116*** | (2006.01) |
| *F21W 111/04* | (2006.01) |
| *F21Y 103/00* | (2016.01) |
| *F21Y 107/50* | (2016.01) |
| *F21Y 113/00* | (2016.01) |
| *F21Y 115/10* | (2016.01) |

(52) U.S. Cl.
CPC ............... *F21S 8/083* (2013.01); *F21S 9/037* (2013.01); *F21V 17/002* (2013.01); *F21V 21/116* (2013.01); *F21W 2111/04* (2013.01); *F21Y 2103/00* (2013.01); *F21Y 2107/50* (2016.08); *F21Y 2113/00* (2013.01); *F21Y 2115/10* (2016.08)

(58) Field of Classification Search
CPC ......... F21S 8/083; F21S 9/037; F21V 17/002; F21V 17/116
See application file for complete search history.

(56) References Cited

U.S. PATENT DOCUMENTS

| | | | | |
|---|---|---|---|---|
| 7,021,787 | B1 | 4/2006 | Kuelbs | |
| 8,672,505 | B1 * | 3/2014 | Hogan | F21S 9/037 362/183 |
| 9,175,821 | B2 | 11/2015 | Adair | |
| 10,309,590 | B2 | 6/2019 | Hollinger | |
| 11,195,390 | B2 * | 12/2021 | Crivellaro | B63B 45/02 |
| 12,448,748 | B2 * | 10/2025 | Buck | F21S 13/02 |
| 2008/0232094 | A1 | 9/2008 | Ramsdell | |
| 2013/0141901 | A1 | 6/2013 | Martzall | |

(Continued)

FOREIGN PATENT DOCUMENTS

| | | | |
|---|---|---|---|
| CN | 210717395 U | * | 6/2020 |

*Primary Examiner* — Gerald J Sufleta, II

(57) ABSTRACT

Disclosed herein are several implementations for an emplaceable dock-piling light comprising variations, combinations, and permutations of the following components: a light compartment comprising a light-emitting source, a control processor, a remote control signal receiver, and a solar-rechargeable battery; an engagement base coupled to the base of the light compartment, said engagement base comprising a post sleeve for engaging the top of a post piling in a manner sufficient to maintain the light compartment atop said post piling; and a compartment top coupled to the light compartment, the compartment top comprising a solar panel for charging the solar-rechargeable battery.

7 Claims, 7 Drawing Sheets

(56) References Cited

U.S. PATENT DOCUMENTS

| | | | | |
|---|---|---|---|---|
| 2019/0024858 | A1* | 1/2019 | Kim | F21V 23/06 |
| 2020/0018455 | A1* | 1/2020 | Bien | E02D 5/22 |
| 2022/0304130 | A1* | 9/2022 | Sreshta | H02J 7/0048 |

* cited by examiner

100

FIG. 3A
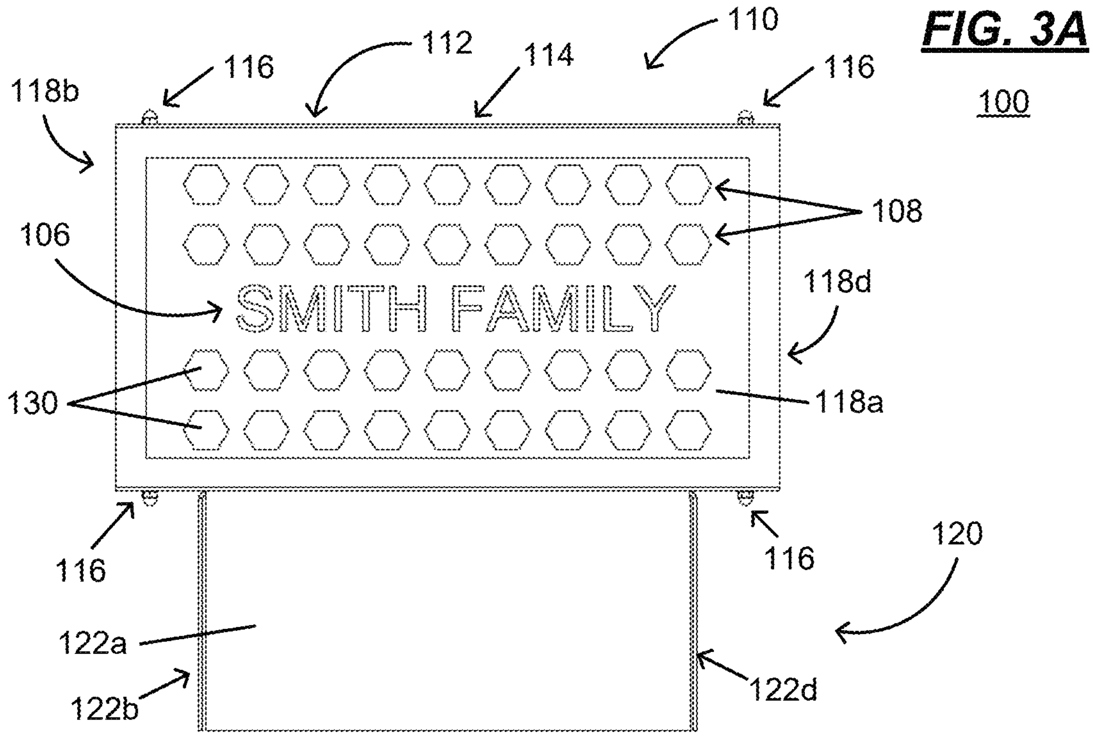
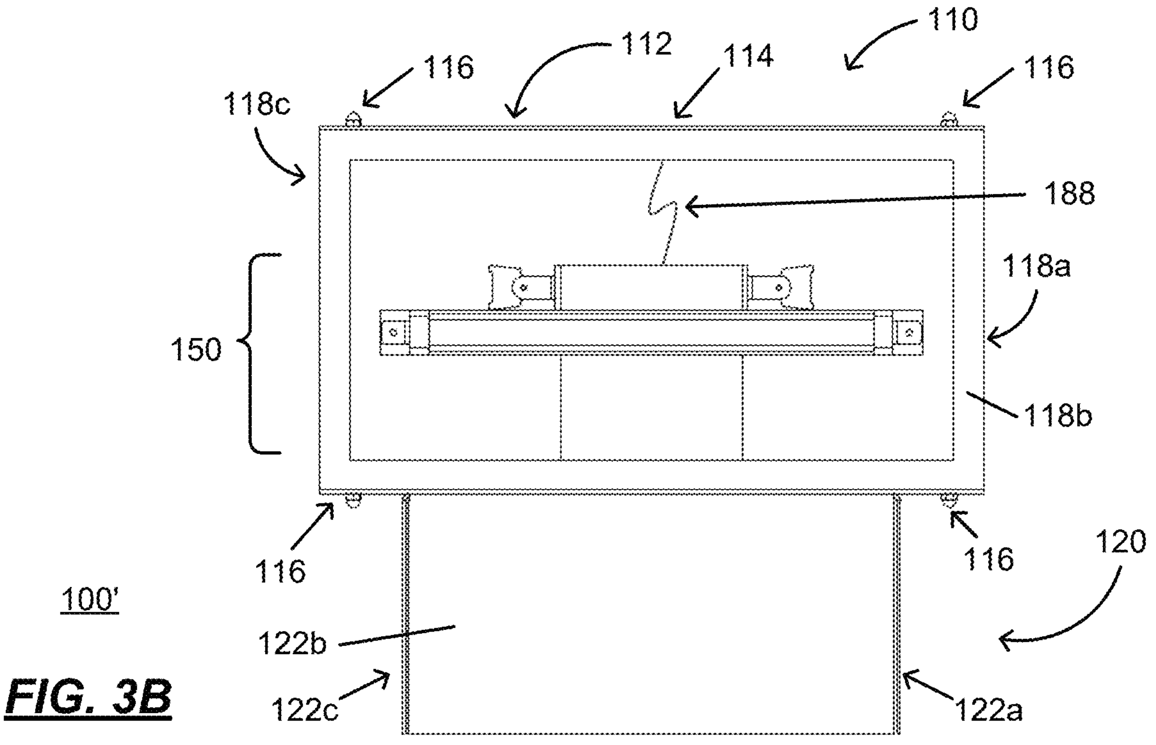
FIG. 3B

100

150

FIG. 5A
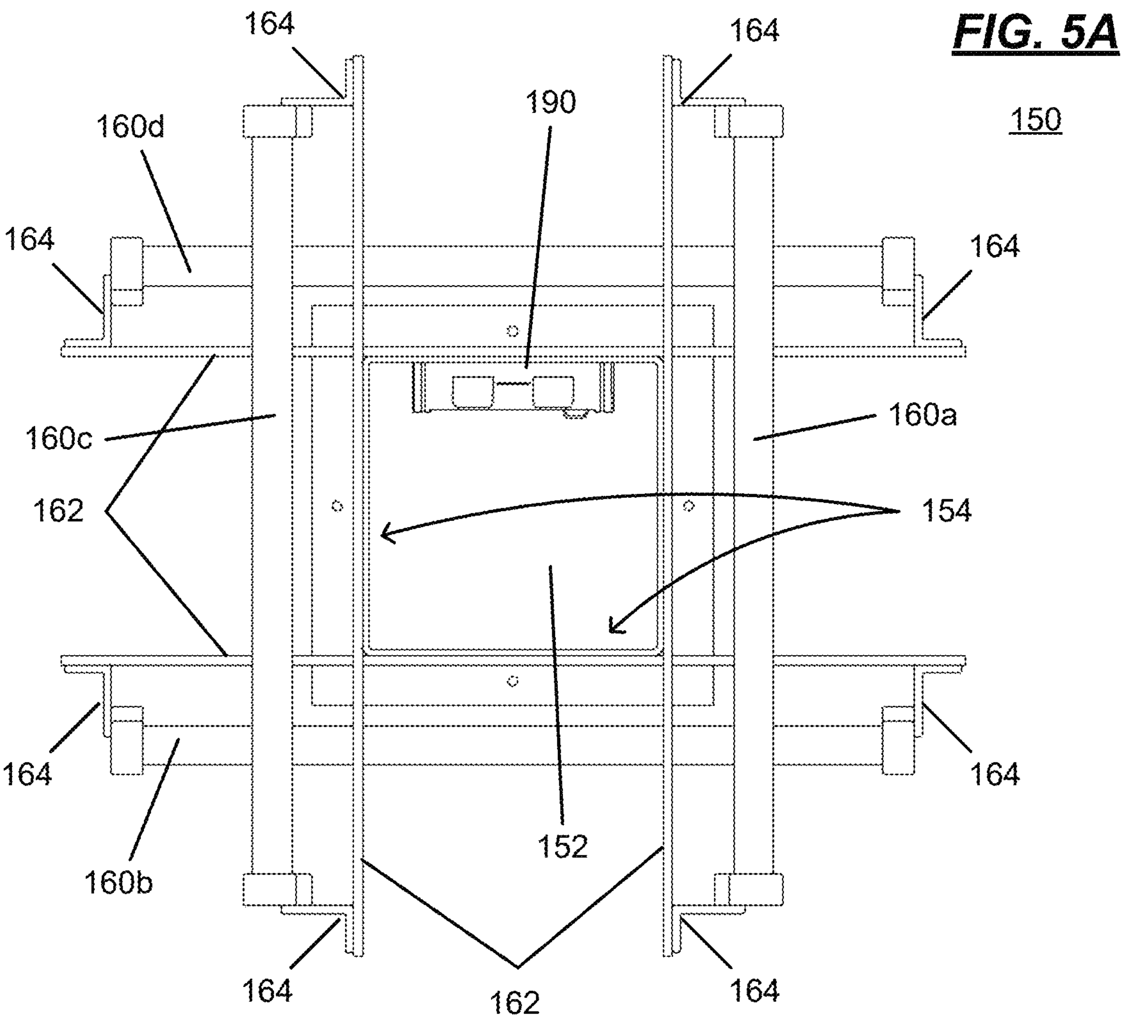
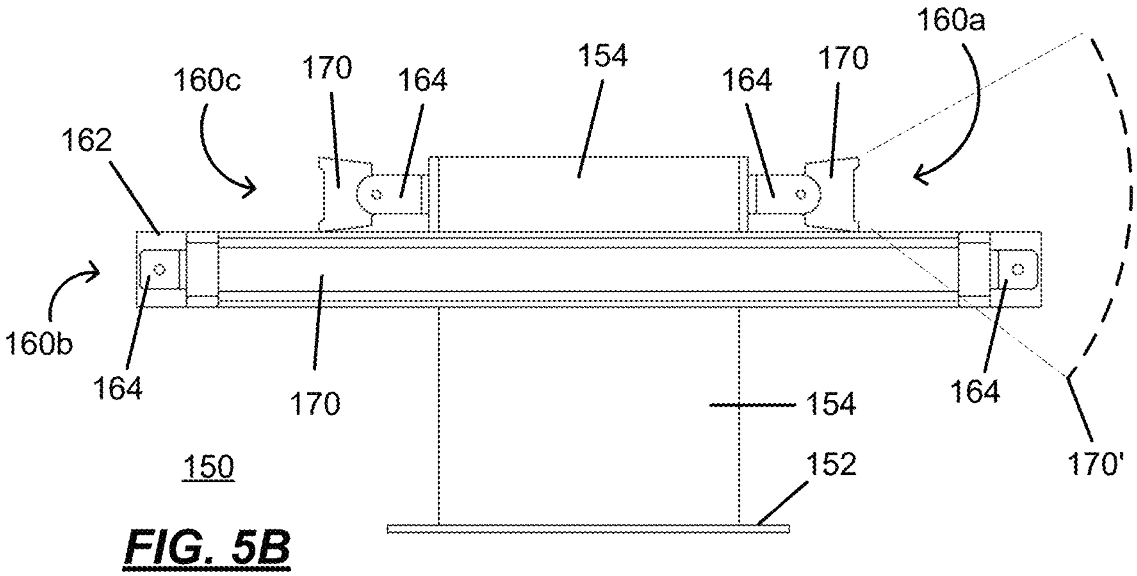
FIG. 5B

DYNAMIC PILING-EMPLACEABLE LIGHTING FOR DOCKS AND PIERS

CROSS-REFERENCE TO RELATED APPLICATION(S)

This application claims benefit of and priority to, and incorporates by reference herein in its entirety, U.S. Provisional Application No. 63/540,739, filed Sep. 27, 2023, titled "DYNAMIC PILING-EMPLACEABLE LIGHTING FOR DOCKS AND PIERS".

BACKGROUND

A dock piling (or "dock post" or "pier post" or "post piling") is a large post or pole driven into the ground to provide stability for structures built over water or other surfaces. Docks and piers are common structures built over water, and dock pilings are an essential component of any dock, pier, or similar structure to stabilize the structure and provide a foundation for the water to flow under, around, and over while also mitigating erosion of the shorelines and coastal areas in which dock pilings are emplaced. Dock pilings are generally emplaced by driving the post or pole vertically into the ground, and deep enough to be embedded-in or immovably engage solid bedrock or other stable material lying under the beach or coastal area where emplaced. Dock pilings may be of different sizes depending on specific needs and other parameters, but they are typically identical for any single structure (or groups of structures in a single area) and may be made from wood, concrete, steel, fiberglass, or other solid materials. Typically the tops of dock pilings are flat or rounded to enable looped lines from boats and ships to easily slip over during mooring, and generally extend vertically approximately 3-5 feet above the upper horizontal surface of the dock or pier to facilitate such slip-over mooring.

Although many docks and piers may also comprise elevated lighting akin to street lights in municipal areas—either as a vertically extended and taller version of a dock piling or, more commonly, as a separate pole attached to a piling or attached directly to the dock or pier itself—such elevated lighting may not provide sufficient desired illumination at the point where a boat or ship is docked or moored. Such lack of adequate lighting may be undesirable both because of negative aesthetics (e.g., "dark and dreary") and for diminished safety at night for people entering, leaving, or traversing the dock or pier in the vicinity of a boat such as, for example, a personal watercraft, sailing vessel, or yacht. As such, there is a need for improved illumination for boats docked at a pier at night, and for improved nighttime illumination at docks and piers in general.

SUMMARY

Various implementations disclosed herein are directed to systems and methods for dynamic piling-emplaceable lighting (DPEL) for docks and piers, including but not limited to architectural customizable solar-powered lights designed for emplacement on top of dock pilings.

More specifically, various implementations disclosed herein are directed to a system for an emplaceable dock piling light, the system comprising: an engagement base for emplacement over the top of a dock piling; a light compartment physically coupled to the engagement base, said light compartment comprising a light-emitting source; a power generator electrically coupled to the system, the power generator being capable of producing storable power; and a power store electrically coupled to the power generator, said power store capable of storing the storable power produced by the power generator and providing the stored power to the light-emitting source.

Several such implementations may further comprise features whereby: the power generator comprises at least one solar panel; the at least one solar panel is located on top of the light compartment; the system further comprises an operational controller for at least controlling operations of the light-emitting source; controlling the light-emitting source comprises at least one from among the group comprising turning on, turning off, changing intensity, changing color, providing a light emission pattern, and processing an interrupt; the light compartment comprises at least one side through which emitted light may pass, and at least one filter for filtering said emitted light through the at least one side; the at least one side may be removed and replaced with a substitute side, or the at least one filter may be removed and replaced with a substitute filter; the light-emitting source comprises directional light-emitting diodes (LEDs); the directional LEDs are configured in an overlapping crisscross configuration (OCCC); the directional LEDs in the OCCC emit light at a 90 degree angle vertically; the directional LEDs in the OCCC emit light at each of four horizontal 90 degree lateral intervals; the light emitted from at least one directional LED evenly illuminates a filter for the emitted light passing through the filter; the directional LEDs are bar-style directional LEDs; the directional LEDs are vertically angled to adjust for being in an upper position or a lower position in the OCCC; the directional LEDs are vertically angled to adjust for being in an upper position or a lower position in the OCCC; and/or the directional LEDs are positioned relative to the location of the filters.

Furthermore, various implementations disclosed herein also may be directed to an emplaceable dock piling light comprising: a light compartment comprising a light-emitting source, a control processor, a remote control signal receiver, and a solar-rechargeable battery; an engagement base coupled to the base of the light compartment, said engagement base comprising a post sleeve for engaging the top of a post piling in a manner sufficient to maintain the light compartment atop said post piling; and a compartment top coupled to the light compartment, the compartment top comprising a solar panel for charging the solar-rechargeable battery. Certain such implementations may also further comprise features whereby: the engagement base further comprises user-customizable side panels; and/or the engagement base is one of a plurality of engagement bases configured to fit a variety of different post piling shapes and/or sizes.

In addition, various implementations disclosed herein may be directed to an apparatus comprising: a light compartment comprising directional light-emitting diodes (LEDs) configured in an overlapping crisscross configuration (OCCC), and said light compartment also comprising at least one changeable side through which emitted light may pass and at least one changeable filter for filtering said emitted light through the at least one side; a solar panel capable of producing storable power located on top of the light compartment and electrically coupled to the system; a battery electrically coupled to the solar panel and capable of storing the storable power produced by the solar panel and providing the stored power to the directional LEDs; an engagement base physically coupled to the bottom of the light compartment for emplacement over the top of a dock piling, said engagement base being capable of being removed and reinstalled; and an operational controller for at least controlling operations of the light-emitting source.

This summary is provided to introduce a selection of concepts in a simplified form that are further described below in the detailed description. This summary is not intended to identify key features or essential features of the claimed subject matter, nor is it intended to be used to limit the scope of the claimed subject matter, nor is it an admission that any of the information provided herein is prior art to the implementations described herein.

BRIEF DESCRIPTION OF THE DRAWINGS

The foregoing summary and the following detailed description of illustrative implementations are better understood when read in conjunction with the appended drawings. For the purpose of illustrating the implementations, there are shown in the drawings example constructions of the implementations; however, the implementations are not limited to the specific methods and instrumentalities disclosed. In the drawings:

FIG. 3A is a front view of the DPEL fixture of FIG. 1 representative of the various implementations disclosed herein;

FIG. 3B is a modified left side view of the DPEL fixture of FIG. 1 representative of the various implementations disclosed herein;

FIG. 5A is a top view of the lighting assembly shown in FIG. 4 representative of the various implementations disclosed herein;

FIG. 5B is a left side view of the lighting assembly shown in FIG. 4 representative of the various implementations disclosed herein;

DETAILED DESCRIPTION

Figure 1:
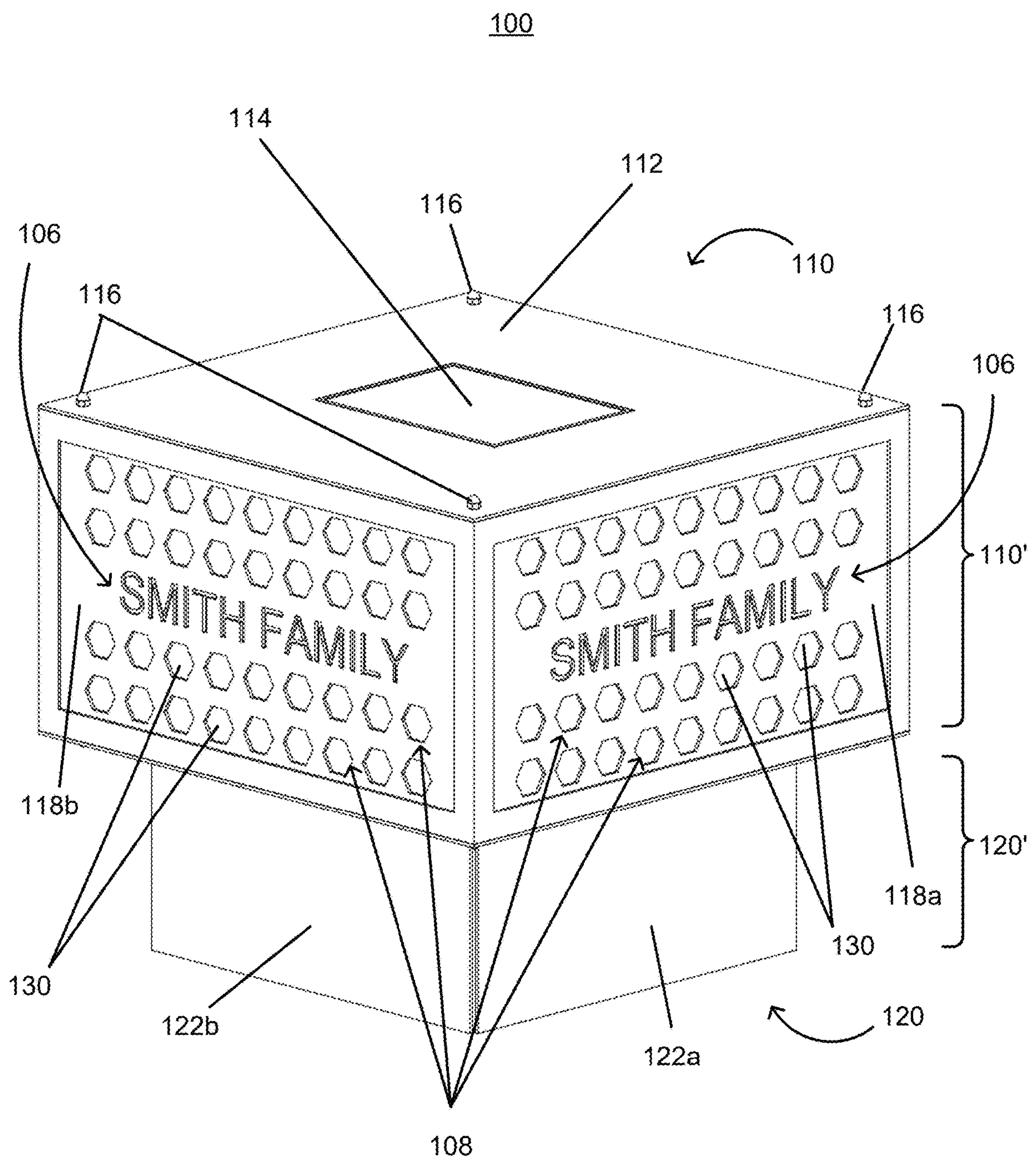
FIG. 1 is an oblique front-and-left-side view of a dynamic piling-emplaceable lighting (DPEL) fixture representative of the various implementations disclosed herein.

Various implementations disclosed herein are directed to an emplaceable dock piling light comprising variations, combinations, and permutations of the following components: a light compartment comprising a light-emitting source, a control processor, a remote control signal receiver, and a solar-rechargeable battery; an engagement base coupled to the base of the light compartment, said engagement base comprising a post sleeve for engaging the top of a post piling in a manner sufficient to maintain the light compartment atop said post piling; and a compartment top coupled to the light compartment, the compartment top comprising a solar panel for charging the solar-rechargeable battery.

Specific features of the various implementations may further include, but are not limited to, a product that is self-installable, available in different shapes and sizes for any and all dock pilings, comprising a base that can be fitted, swapped, or adjusted to any and all standard dock pilings, remotely controllable and variable as to color sighting, customizable to provide different and/or changeable architectural designs, colors, messages, etc., and/or built to withstand salt air and water environments. Furthermore, in addition to safety and benefit of people on docks and piers at night, lighting dock pilings as performed by the various implementations herein described may also provide some navigational safety through visual sighting to boaters of the dock pilings that extend into the waterways.

As described earlier herein, a dock piling (or "dock post") is a large post or pole driven into the ground to provide stability for structures built over water. Docks and piers are common structures built over water, and dock pilings are an essential component of any dock, pier, or similar structure to stabilize the structure and provide a foundation for the water to flow under, around, and over while also mitigating erosion of the shorelines and coastal areas in which dock pilings are emplaced. Dock pilings are generally emplaced by driving the post or pole vertically into the ground, and deep enough to be embedded-in or immovably engage solid bedrock or other stable material lying under the beach or coastal area where emplaced. Dock pilings may be of different sizes depending on specific needs and other parameters, but they are typically identical for any single structure (or groups of structures in a single area) and may be made from wood, concrete, steel, fiberglass, or other solid materials. Typically the tops of dock pilings are flat or rounded to enable looped lines from boats and ships to easily slip over during mooring, and generally extend vertically approximately 3-5 feet above the upper horizontal surface of the dock or pier to facilitate such slip-over mooring.

Although many docks and piers may also comprise elevated lighting akin to street lights in municipal areas—either as a vertically extended and taller version of a dock piling or, more commonly, as a separate pole attached to a piling or attached directly to the dock or pier itself—such elevated lighting may not provide sufficient desired illumination at the point where a boat or ship is docked or moored. Such lack of adequate lighting may be undesirable both because of negative aesthetics (e.g., "dark and dreary") and for diminished safety at night for people entering, leaving, or traversing the dock or pier in the vicinity of a boat such as, for example, a personal watercraft, sailing vessel, or yacht. As such, there is a need for improved illumination for boats docked at a pier at night and for improved nighttime illumination at docks and piers in general.

Accordingly, disclosed herein are various implementations directed to dynamic piling-emplaceable lighting (DPEL) for docks and piers, including but not limited to architectural customizable solar-powered lights designed for emplacement on top of dock pilings.

While there may be some minor distinctions between a dock and a pier—a dock being where boats may be tied up while a pier may be a transitional structure between water and land, that is, a dock being akin to a parking lot while a pier is more akin to a sidewalk, for example—the terms dock and pier may be used interchangeably herein and are intended to encompass both the aforementioned analogous "parking lot" and "sidewalk" components and features. Similarly, the terms parking, docking, and mooring may also be used interchangeably throughout this disclosure and should be given the broadest reasonable common meaning with regards to both docks and piers.

Furthermore, an understanding of various concepts is helpful toward a broader and more complete understanding of the various implementations disclosed herein, and skilled artisans will readily appreciate the implications these various concepts have on the breadth and depth of the various implementations herein disclosed. And while the several and various implementations disclosed herein may be described as specifically pertaining to or directed to use in a specific context, such implementations may be equally applied to any and all other contexts where such implementations may be utilized. As such, nothing herein is intended to limit the various implementations solely to a finite set of implementations but, instead, the various implementations disclosed herein are to be applied to an unlimited variety of different utilizations, and thus the disclosures made herein should be read as broadly as possible. Moreover, certain terms used herein may also be used interchangeably with other terms used herein and such terms should be given the broadest interpretation possible unless explicitly noted otherwise.

Based on these understandings and parameters for proper interpretation of the disclosures made herein, skilled artisans will well-understand and readily-appreciate the breath and scope of the various implementations herein disclosed.

DPEL Fixture

Figure 2:
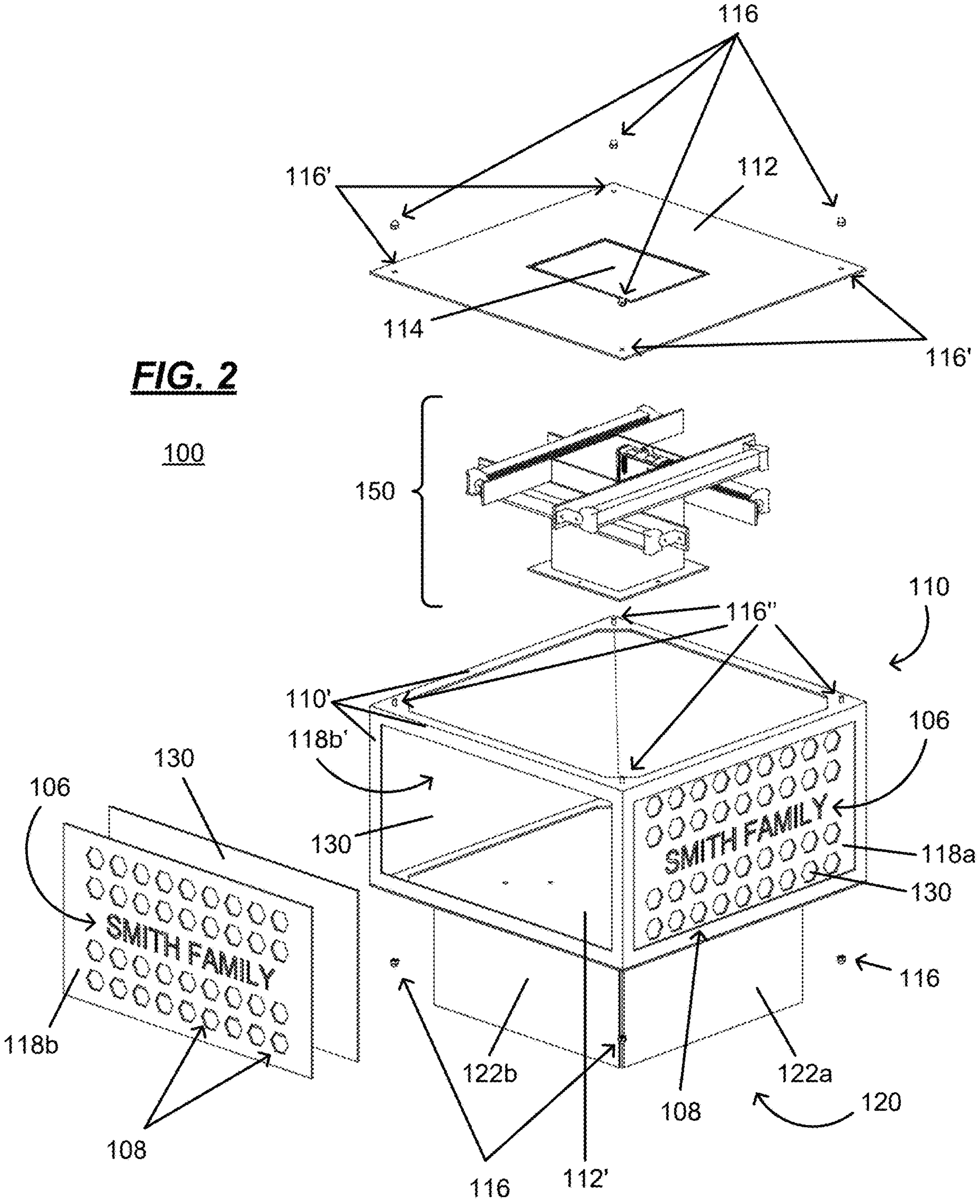
FIG. 2 is an exploded oblique front-and-left-side view of the DPEL fixture of FIG. 1 representative of the various implementations disclosed herein.
Figure 3C:
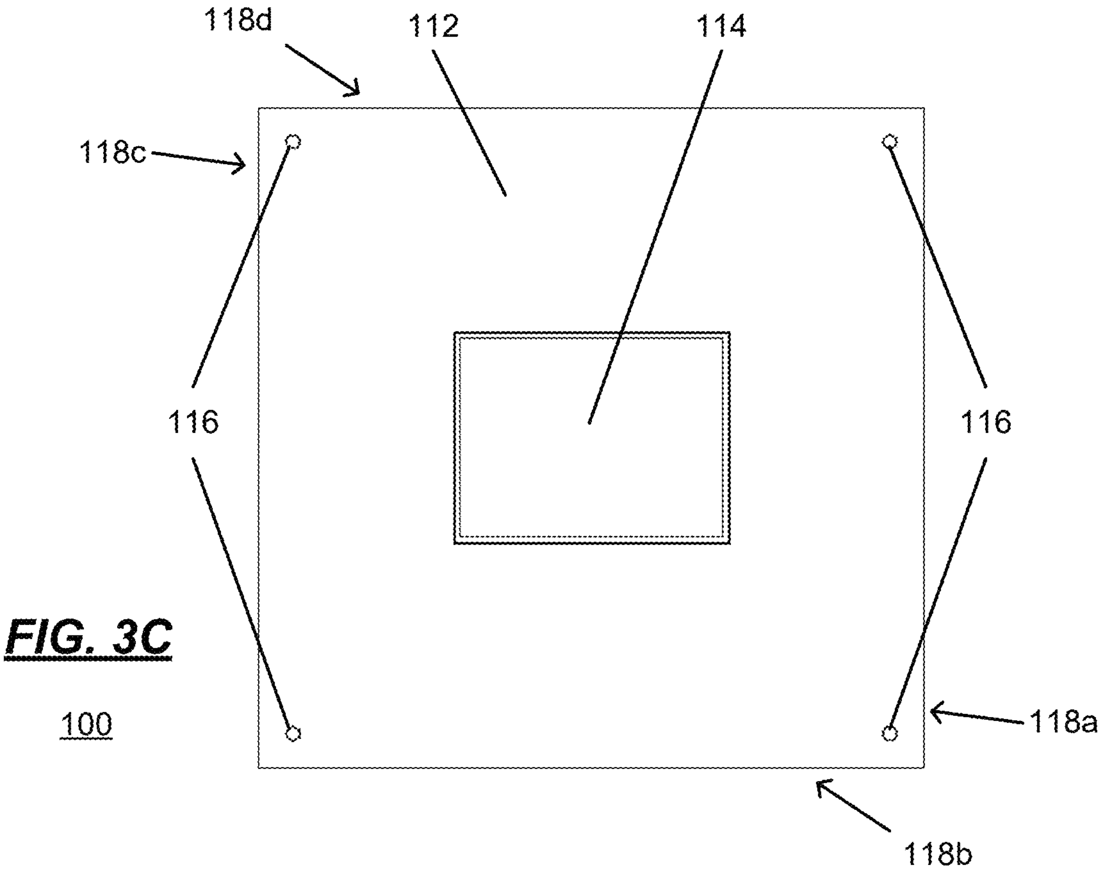
FIG. 3C is a top view of the DPEL fixture of FIG. 1 representative of the various implementations disclosed herein.

FIG. 1 is an oblique front-and-left-side view of a dynamic piling-emplaceable lighting (DPEL) fixture 100 representative of the various implementations disclosed herein. FIG. 2 is an exploded oblique front-and-left-side view of the DPEL fixture 100 of FIG. 1 representative of the various implementations disclosed herein. FIG. 3A is a front view of the DPEL fixture 100 of FIG. 1 representative of the various implementations disclosed herein. FIG. 3B is a modified left side view of the DPEL fixture 100' of FIG. 1 (shown without the side panels 118 or filters 130) representative of the various implementations disclosed herein. FIG. 3C is a top view of the DPEL fixture 100 of FIG. 1 representative of the various implementations disclosed herein. FIG. 3A, FIG. 3B, and FIG. 3C may be collectively referred to herein as FIG. 3.

As illustrated in FIGS. 1-3, the DPEL fixture 100 comprises a light compartment 110 (roughly defined by the right edge reference 110') affixed to an engagement base 120 (roughly defined by the right edge reference 120'). The light compartment 110 further comprises a top 112, a front side 118*a*, a left side 118*b*, a back side 118*c*, and a right side 118*d*, a mounting base 112', a frame 110' (exemplarily illustrated in FIG. 2 as a cuboid arrangement of edges), and a lighting assembly 150 (described in more detail with regard to FIGS. 4-5). The front side 118*a*, the left side 118*b*, the back side 118*c*, and the right side 118*d* may be collectively referred to herein as a side 118 or the sides 118 for convenience. The engagement base 120 further comprises a front surface 122*a*, a left surface 122*b*, a back surface 122*c*, and a right surface 122*d*, which may be collectively referred to herein as a surface 118 or the surfaces 118 for convenience.

Although the DPEL fixture 100 shown in FIGS. 1-3 comprises four sides 118 in a square configuration, various alternative implementations may have greater or fewer sides and/or a configuration other than square. Furthermore, the light compartment 110 may have a different number of sides than the engagement base 120 and/or the light compartment 110 may have a different configuration than the engagement base 120. Regardless, the engagement base 120 is specifically configured to slide onto and operationally engage the top and top-adjacent sides of a post piling in such a manner that the underside of the mounting base 112' may rest atop the top of the post piling upon which the DPEL fixture 100 is placed.

The top 112 of the DPEL fixture 100 may further comprise a solar panel 114 (or a plurality of solar panels) which in turn may be operationally coupled to a lighting assembly 150 via a cable 188 (as specifically shown in FIG. 3B). The top 112 and mounting base 112' may also comprise one or more post holes 116', while the frame 110' may further comprise one or more posts 116" capable of passing through said post holes 116' and be engaged by one or more post connectors 116 to fixedly couple the top 112 and the mounting base 112' to the frame 110'. For certain implementations, the posts 116" may be threaded posts or embedded bolts, for example, and the post connectors 116 may nuts or capped nuts. The surfaces 118 of the engagement base 120 may be fixedly coupled together and collectively affixed to the mounting base 112' of the light compartment 110 as shown; however, for certain alternative implementations, the surfaces 118 may be individually affixed to the mounting base 112' and only operationally coupled together.

One or more of the sides 118 of the DPEL fixture 100 may be removable, exchangeable, and or replaceable with other sides 118. The sides 118 may be an opaque material with various openings 108 through which light emitting from the interior of the frame 110' may pass. The sides may also comprise a translucent filter 130 through which such emitted light can pass. While various implementations herein may utilize a side 118 with a filter 130 as shown, certain alternative implementations may instead utilize filters 130 in lieu of sides 118 or may use various filters 130 in conjunction with the sides 118. Moreover, different sides may use different filters or have different openings 108. Regardless, the sides 118 may also feature custom or personalized features such as markings 106 which may be etched onto one or more of the sides 118 or which may be cut into one or more of the sides 118 to also permit light to emit therethrough. As such, decorative design of the sides 118 can be any of several different variations, alternatives, or configurations that will be well-known and readily-appreciated by skilled artisans.

Because post pilings on a dock or a pier generally have the same shape and dimensions as each other, and because certain shapes and dimensions may also be standardized across multiple docks and piers, DPEL fixtures 100 can be mass-produced to match these various shapes and dimensions for ready-use.

Lighting Assembly

Figure 4:
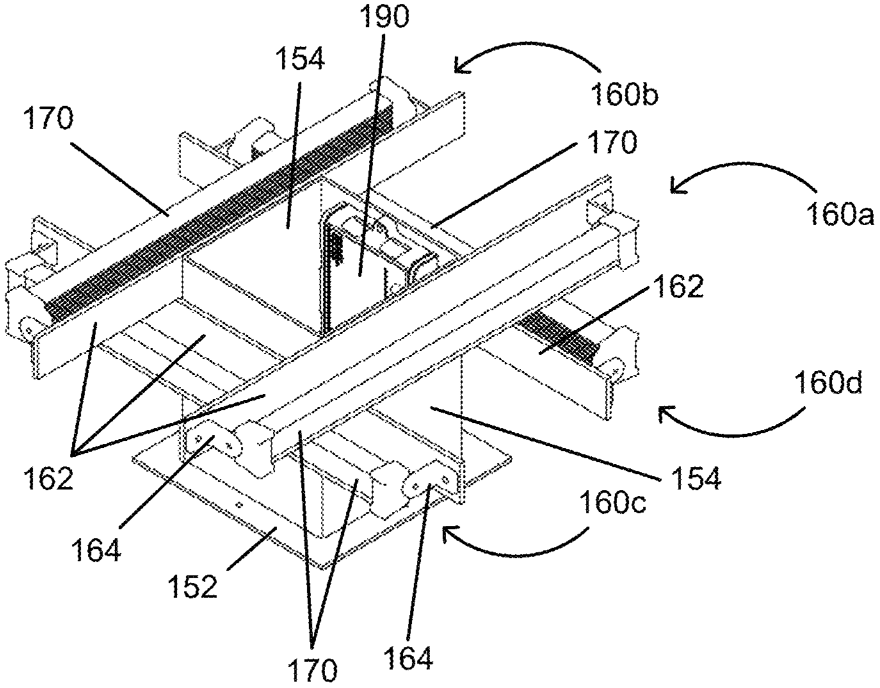
FIG. 4 is an oblique front-and-left-side view of the lighting assembly exposed in FIG. 3B representative of the various implementations disclosed herein.

FIG. 4 is an oblique front-and-left-side view of the lighting assembly 150 exposed in FIG. 3B representative of the various implementations disclosed herein. FIG. 5A is a top view of the lighting assembly 150 shown in FIG. 4 representative of the various implementations disclosed herein. FIG. 5B is a left side view of the lighting assembly 150 shown in FIG. 4 representative of the various implementations disclosed herein. FIG. 5A and FIG. 5B may be collectively referred to herein as FIG. 5.

As illustrated in FIGS. 4-5, the lighting assembly 150 may further comprise a mini base 152 fixedly coupled to a tower 154 shown as rectangular, hollow, and open at the top. Within the hollow of the tower 154 may be fixedly coupled an electronic assembly 190 which in turn variously may comprise a solar panel controller, power storage (e.g., a battery) and a computing environment with input/output channels such as a remote-control interface. Mounted on the exterior of the tower are a plurality of bar-style directional light-emitting diodes (LEDs) in an overlapping crisscross configuration (OCCC) illustrated here as four LEDs total comprising LED 160*a*, LED 160*b*, LED 160*c*, and LED 160*d* which collectively may be referred to herein as LEDs 160 or each generally referred to as LED 160. Each of the bar-style directional LEDs 160 may further comprise a mount plate 162 (fixedly coupled to the tower 154), a floating LED housing 170, and connectors 164 for operably attaching the floating LED housing 170 to a corresponding mount plate 162.

Each bar-style directional LED 160 may comprise a bar-style light-emitting diode (or a series of light-emitting diodes arranged bar-style) located within the floating LED housing 170 where the shape and reflective inner surfaces of the floating LED housing 170 by its structure and design, coupled with orientation of the light-emitting diode itself, together operate to evenly channel and direct the light 170' emitted thereby (shown as dashed lines) onto and through a corresponding filter 130 such that the filter is evenly illuminated with no apparent brighter regions or darker regions from the perspective of a typical human observer. To achieve this effect, the floating LED housing 170 is specifically designed to operate at a set angle and a set position and distance from the corresponding filter 130. For example, with reference to FIG. 5, for a filter that is 20 inches wide by 10 inches tall, and for a floating LED housing 170 that is 16 inches wide and 1.5 inches tall, the floating LED housing 170 may be positioned with its front light-emitting edge being approximately centered relative to the filter 130 at a distance from said filter 130 corresponding with the angle of light 170' emitted from the floating LED housing 170.

Based on the foregoing dimensions, for a 90-degree angle of light 170' emitted from the floating LED housing 170, the distance between the front of the floating LED housing 170 to the filter 130 should be approximately 4.25 inches or, alternatively, within a range of 4.00-4.50 inches, within a range of 3.50-5.00 inches, or within other suitable ranges.

Because of the overlapping crisscross configuration (OCCC) of the plurality of bar-style directional LEDs 160, for the relatively higher positioned individual bar-style directional LEDs 160*a* and 160*c* the floating LED housing 170 may be angled slightly downward, and for the relatively lower positioned individual bar-style directional LEDs 160*b* and 160*d* the floating LED housing 170 may be angled slightly upward, so that all floating LED housings 170 may emit light 170' centered on their corresponding filter 130.

System and Method

Figure 6:
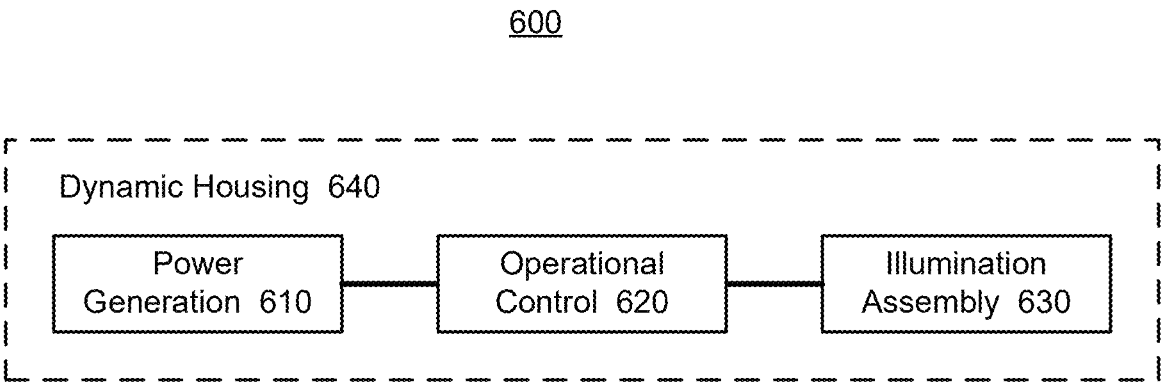
FIG. 6 is a modified block diagram illustrating an exemplary system for performing dynamic piling-emplaceable lighting (DPEL) representative of the various implementations disclosed herein.

FIG. 6 is a modified block diagram illustrating an exemplary system 600 for performing dynamic piling-emplaceable lighting (DPEL) representative of the various implementations disclosed herein. In FIG. 6, the system comprises a power generation 610 component such as a solar panel 114 and accompanying power storage (e.g., a battery). The power generation 610 may be operationally coupled to an operational control 620 component for controlling power generation and storage, input/output of operating parameters and other information, and operational parameters for the emission of light 170'. Operation control 620 in turn may be operationally coupled to an illumination assembly 630 such as light assembly 150. The illumination assembly 630 may be coupled to the power generation 610 indirectly through the operational control 620 or directly (not shown). These components may then be housed withing a dynamic housing 640 such as the dynamic piling-emplaceable lighting (DPEL) fixture 100 for deployment and utilization.

Figure 7:
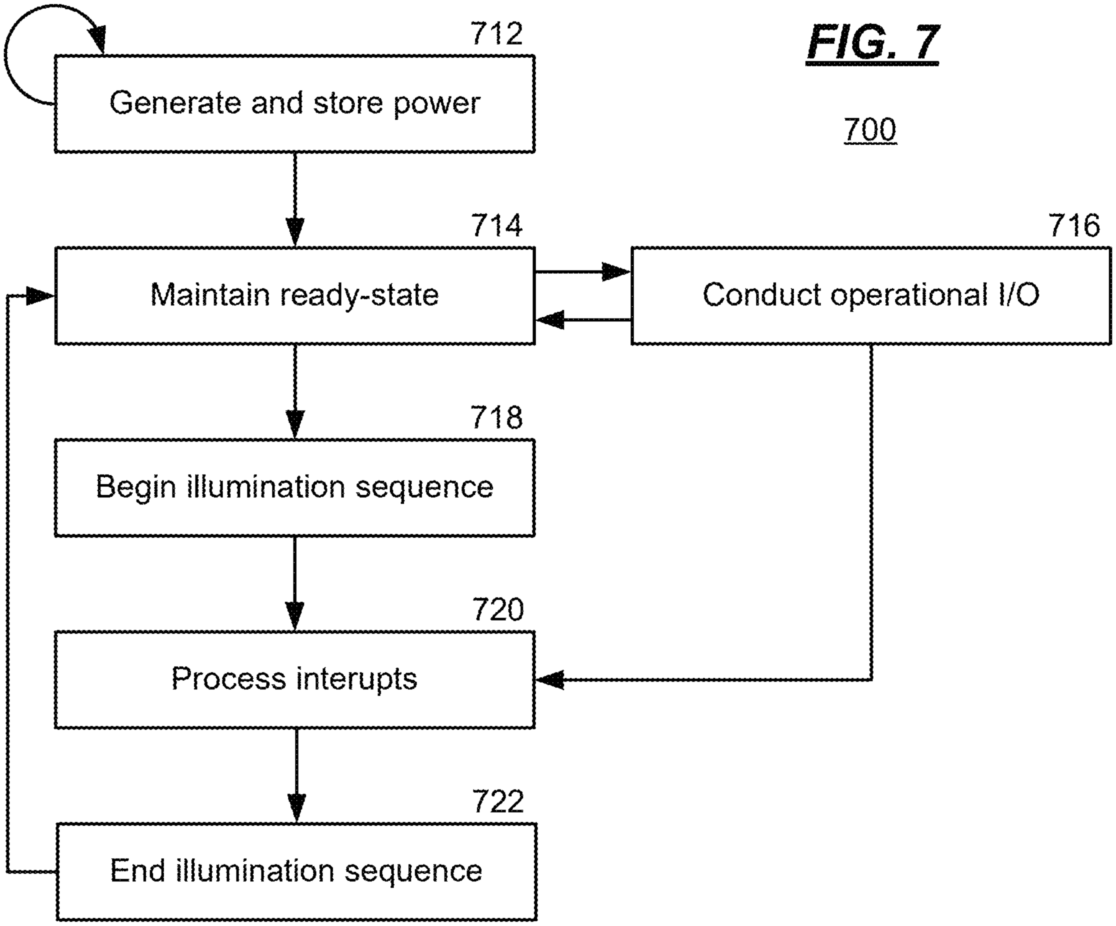
FIG. 7 is a process flow diagram illustrating an exemplary approach for performing dynamic piling-emplaceable lighting (DPEL) representative of the various implementations disclosed herein.

FIG. 7 is a process flow diagram 700 illustrating an exemplary approach for performing dynamic piling-emplaceable lighting (DPEL) representative of the various implementations disclosed herein. As illustrated in FIG. 7, the process may begin at 712 with generating and storing power that may be produced continuously or iteratively and/or cyclically from a solar panel 114 or other generating source (wind generator, wave generator, etc.). Using this power directly or from storage (i.e., a battery charged by the solar panel 114), at 714 the system may then maintain a ready-state to receive input/output communications (such as via an infrared remote control, a wireless connection, an on-board keying or button system, or any other known means) that might set operating parameters for on and off times, illumination brightness, and other conditions or events (such as providing illumination when solar power generation dips below a first threshold and discontinuing illumination when the solar power generation rises above a second threshold). At 716 the system iteratively conducts operational input/output to receive user input or provide user output regarding operational states of the system. At 718 the system begins an illumination sequence that may be based in part on user input and selection of different illumination options and/or timing that is user-specified or triggered by monitored threshold conditions (such as via the solar panel as described above). The system further monitors for and processes interrupts (such as exception handling) that, at 720, may be system generated or that may be the result of operational input/outputs. For example, a system interrupt may be generated due to a low power storage condition, and the system may respond by overriding and discontinuing the illumination sequence in progress. Whether the result of an interrupt or the programmed end of the illumination sequence (which again may be triggered by other monitored threshold conditions such as via the solar panel), at 722 the system ends the illumination sequence and returns to the maintain ready-state at 714.

Additional DPEL Features

Notably, various implementations disclosed herein for a DPEL fixture 100 may provide additional improvement and benefits over current post piling lights and/or covers (the latter being needed to prevent damage to said post pilings). For example, although the top of the DPEL fixture 100 could be augmented with protruding wires to discourage birds from landing/resting on (and defecating upon) the top of the post pilings (and the DPEL fixture 100 itself) like other existing embodiments of post piling covers, caps, or markers, the solar panel 114 assembly of the DPEL fixture 100 can alone provide a natural deterrent to birds without the need for such wires or other visibly garish protuberances and the like. Furthermore, the DPEL fixture 100 may also provide illuminated markers and guides for boats departing or returning to docks or piers. Of course, the DPEL fixture 100 may provide both lighting for pedestrians walking the dock or pier, and may further provide an aesthetic enhancement to the post pilings upon which emplaced, that is, customized for the boat owners at the piling posts where emplaced, or customized with marketing names, logos, and the like for a business using the docks or piers or providing the docks or piers. It is also advantageous that the self-contained and self-powered DPEL fixture 100 can be easily emplaced and removed for later emplacement again elsewhere in a different location but having similar sized and shaped post pilings.

Additionally, the sides of the DPEL fixture 100 may be changeable to permit variation of light displayed, and the filters may also be changeable to permit variation in light color or other effects. Furthermore, multiple DPEL fixtures 100 may be communicatively coupled (e.g., short-range wireless, etc.) and coordinated to turn on or off in tandem, and/or glow brighter or dimmer in a pattern, among various other options that will be readily appreciated by skilled artisans. Such DPEL fixtures 100 may also be integrated into a "smart house" operation. Moreover, the DPEL fixtures 100—and specifically the individual bar-style directional LEDs 160 therein, for example—may also comprise different color light-emitting diodes (e.g., such as the three or four primary colors used in color image projection) which may be varied for a broad range of emitted colors and visual effects during operation, and/or may also comprise light-emitting diodes that operate in ultraviolet (UV) or infrared (IR) ranges for any known application that could benefit therefrom.

Specific Implementations

Based on the forgoing—and as will be well-understood and readily-appreciated by persons of ordinary skill in the relevant art at the time of invention—various implementations disclosed herein are directed to systems and methods for dynamic piling-emplaceable lighting (DPEL) for docks and piers, including but not limited to architectural customizable solar-powered lights designed for emplacement on top of dock pilings.

More specifically, various implementations disclosed herein are directed to a system for an emplaceable dock piling light, the system comprising: an engagement base for emplacement over the top of a dock piling; a light compartment physically coupled to the engagement base, said light compartment comprising a light-emitting source; a power generator electrically coupled to the system, the power generator being capable of producing storable power; and a power store electrically coupled to the power generator, said power store capable of storing the storable power produced by the power generator and providing the stored power to the light-emitting source.

Several such implementations may further comprise features whereby: the power generator comprises at least one solar panel; the at least one solar panel is located on top of the light compartment; the system further comprises an operational controller for at least controlling operations of the light-emitting source; controlling the light-emitting source comprises at least one from among the group comprising turning on, turning off, changing intensity, changing color, providing a light emission pattern, and processing an interrupt; the light compartment comprises at least one side through which emitted light may pass, and at least one filter for filtering said emitted light through the at least one side; the at least one side may be removed and replaced with a substitute side, or the at least one filter may be removed and replaced with a substitute filter; the light-emitting source comprises directional light-emitting diodes (LEDs); the directional LEDs are configured in an overlapping crisscross configuration (OCCC); the directional LEDs in the OCCC emit light at a 90 degree angle vertically; the directional LEDs in the OCCC emit light at each of four horizontal 90 degree lateral intervals; the light emitted from at least one directional LED evenly illuminates a filter for the emitted light passing through the filter; the directional LEDs are bar-style directional LEDs; the directional LEDs are vertically angled to adjust for being in an upper position or a lower position in the OCCC; the directional LEDs are vertically angled to adjust for being in an upper position or a lower position in the OCCC; and/or the directional LEDs are positioned relative to the location of the filters.

Furthermore, various implementations disclosed herein also may be directed to an emplaceable dock piling light comprising: a light compartment comprising a light-emitting source, a control processor, a remote control signal receiver, and a solar-rechargeable battery; an engagement base coupled to the base of the light compartment, said engagement base comprising a post sleeve for engaging the top of a post piling in a manner sufficient to maintain the light compartment atop said post piling; and a compartment top coupled to the light compartment, the compartment top comprising a solar panel for charging the solar-rechargeable battery. Certain such implementations may also further comprise features whereby: the engagement base further comprises user-customizable side panels; and/or the engagement base is one of a plurality of engagement bases configured to fit a variety of different post piling shapes and/or sizes.

In addition, various implementations disclosed herein may be directed to an apparatus comprising: a light compartment comprising directional light-emitting diodes (LEDs) configured in an overlapping crisscross configuration (OCCC), and said light compartment also comprising at least one changeable side through which emitted light may pass and at least one changeable filter for filtering said emitted light through the at least one side; a solar panel capable of producing storable power located on top of the light compartment and electrically coupled to the system; a battery electrically coupled to the solar panel and capable of storing the storable power produced by the solar panel and providing the stored power to the directional LEDs; an engagement base physically coupled to the bottom of the light compartment for emplacement over the top of a dock piling, said engagement base being capable of being removed and reinstalled; and an operational controller for at least controlling operations of the light-emitting source.

This summary is provided to introduce a selection of concepts in a simplified form that are further described below in the detailed description. This summary is not intended to identify key features or essential features of the claimed subject matter, nor is it intended to be used to limit the scope of the claimed subject matter, nor is it an admission that any of the information provided herein is prior art to the implementations described herein.

Example Computing Environment

Various implementations disclosed herein may also be augmented, automated, or more efficiently and effectively operated in conjunction with computing systems and software specifically developed for these purposes.

Figure 8:
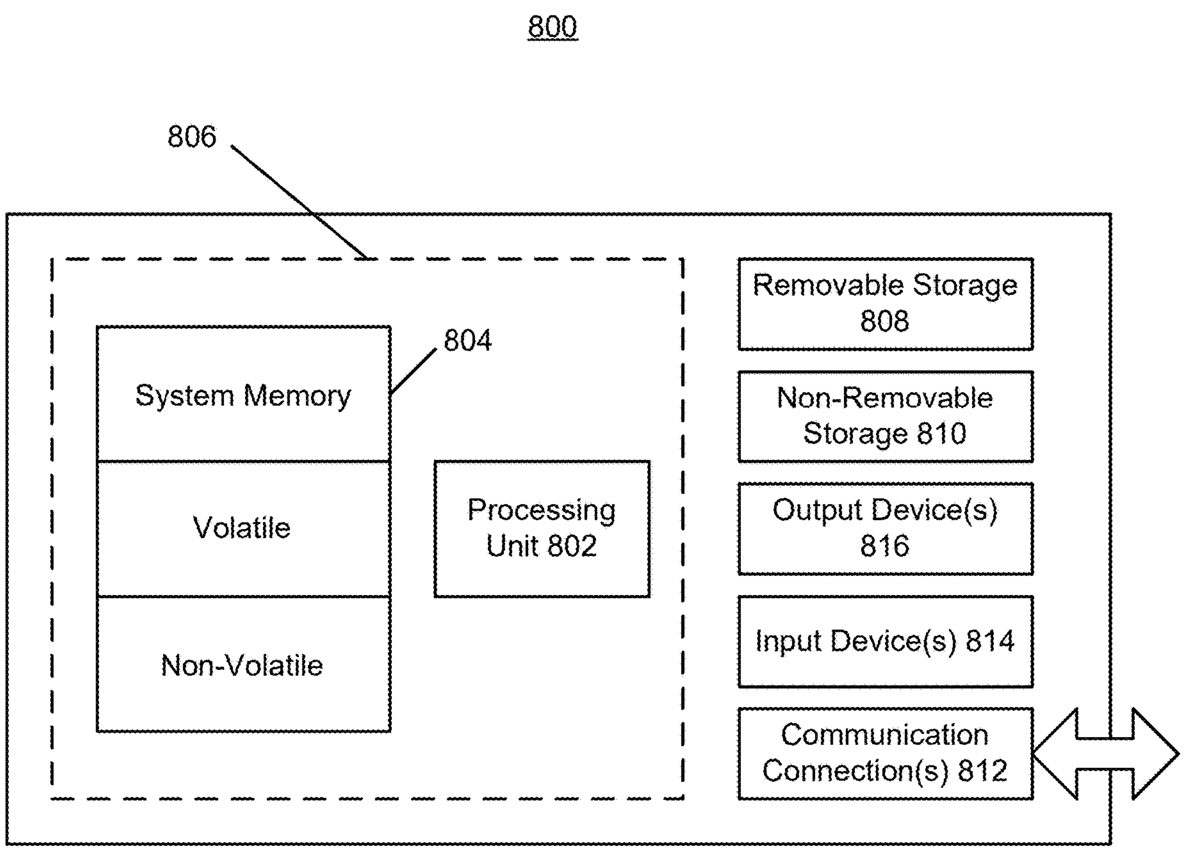
FIG. 8 is a block diagram of an example computing environment that may be used in conjunction with any of the various implementations and aspects herein disclosed.

FIG. 8 is a block diagram of an example computing environment that may be used in conjunction with example implementations and aspects such as those disclosed and described with regards to the other figures presented herein and herewith. The computing system environment is only one example of a suitable computing environment and is not intended to suggest any limitation as to the scope of use or functionality.

Numerous other general purpose or special purpose computing system environments or configurations may be used.

Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 8, an example system for implementing aspects described herein includes a computing device, such as computing device 800. In a basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This basic configuration is illustrated in FIG. 8 by dashed line 806 and may be referred to collectively as the "compute" component.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810. Computing device 800 typically includes a variety of computer readable media. Computer readable media can be any available media that can be accessed by device 800 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, and so forth. Output device(s) 816 such as a display, speakers, printer, and so forth may also be included. All these devices are well-known in the art and need not be discussed at length herein. Computing device 800 may be one of a plurality of computing devices 800 inter-connected by a network. As may be appreciated, the network may be any appropriate network, each computing device 800 may be connected thereto by way of communication connection(s) 812 in any appropriate manner, and each computing device 800 may communicate with one or more of the other computing devices 800 in the network in any appropriate manner. For example, the network may be a wired or wireless network within an organization or home or the like and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, for example, through the use of an API, reusable controls, or the like. Such programs may be implemented in a high-level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended to limit the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer program instructions for use with or by the implementations disclosed herein may be written in an object-oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire, and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A system for an emplaceable dock piling light, the system comprising:

an engagement base for emplacement over the top of a vertical dock piling and oriented vertically relative to said vertical dock piling;

a light compartment physically coupled to the engagement base, said light compartment comprising a light-emitting source comprising four bar-style directional light-emitting diodes (LEDs) configured in an overlapping crisscross configuration (OCCC) and oriented at consecutive ninety-degree angles on a horizontal plane relative to the vertical dock piling to provide four-directional non-overlapping light emissions;

a power generator electrically coupled to the system, the power generator being capable of producing storable power, the power generator comprising at least one uncovered solar panel that operates to prevent bird landings without utilizing protuberances; and a power store electrically coupled to the power generator, said power store capable of storing the storable power produced by the power generator and providing the stored power to the light-emitting source.

2. The system of claim 1, wherein the at least one solar panel is oriented horizontal to the vertical dock piling.

3. The system of claim 2, wherein the at least one solar panel is located on top of the light compartment.

4. The system of claim 1, wherein the system further comprises an operational controller for at least controlling operations of the light-emitting source.

5. The system of claim 4, wherein controlling the light-emitting source comprises at least one from among the group comprising turning on, turning off, changing intensity, changing color, providing a light emission pattern, and processing an interrupt.

6. The system of claim 1, wherein the light compartment comprises at least four sides through which emitted light may pass, and at least four filters for filtering said emitted light through the at least four sides.

7. The system of claim 6, wherein at least one side from among the at least four sides may be removed and replaced with a substitute side, or wherein at least one filter from among the at least four filters may be removed and replaced with a substitute filter.

* * * * *